United States Patent Office 3,149,093
Patented Sept. 15, 1964

3,149,093
STABILIZING POLYPROPYLENE
Arthur C. Hecker, Forest Hills, and Norman L. Perry, Seaford, N.Y., assignors to Argus Chemical Corporation, a corporation of New York
No Drawing. Filed Oct. 7, 1958, Ser. No. 765,721
14 Claims. (Cl. 260—45.75)

This invention relates to synergistic stabilizer combinations useful in the stabilization of polypropylene against change in melt viscosity at elevated temperatures for a sufficient time to permit working or molding the polymer into desired shapes and configurations, and to the stabilized polypropylene thereby obtained.

Polypropylene is a tough, high-melting polymeric material. Its softening point is sufficiently high to make it difficult to process in conventional plastics processing equipment. When charged to a plastics mill at a temperature sufficient to soften it, approximately 350° F., it is initially very difficult to band. When it bands it constitutes a tough rubbery mass. As milling is continued at 350° F., the polymer quickly becomes more workable, and after about four minutes it becomes quite plastic and may be worked easily. As milling is continued beyond this stage, however, the polymer flow behavior changes rapidly, and it becomes rather fluid, and begins to stick to the mill rolls. By the time the polypropylene has been milled at 350° F. for ten minutes, it has been converted into a sticky, quite fluid mass which can be removed from the mill only with great difficulty, and is impossible to handle in conventional equipment. At more elevated temperatures, the polypropylene deteriorates even more rapidly into the sticky, fluid mass.

Such behavior makes polypropylene very difficult to process. Milling, calendering, extrusion, injection molding and fiber-forming become almost impossible unless they can be carried out within a few minutes' time, before the polypropylene has time to change drastically its flow behavior. In order to accommodate the system to the change in flow behavior with time, it would be necessary to use exceptionally high temperatures initially and then rapidly to reduce the working temperature to maintain a sufficiently high viscosity to permit handling as the polymer degrades. This would, of course, be impossible in conventional equipment.

The change in fluidity of any thermoplastic polymer with temperature can be followed quantitatively with a Brabender Plastograph (India Rubber World, October 1947, p. 62). This well known instrument measures a polymer's melt viscosity at elevated temperatures, using as a gauge the resistance the molten polymer offers to the rotation of two sigma blades. The resistance to rotation is transmitted through a torque converter, which graphs the resistance in terms of kilogram-centimeters of torque against the time used in making the test. The stability is evaluated by the rate of change of melt viscosity expressed in kilogram-centimeters of torque with time.

The rate of change in the Brabender Plastograph test measurement in kilogram-centimeters of torque per unit of time for a 35 gram sample of polypropylene at 193° C. with the instrument operating at 60 r.p.m. is used throughout in this specification and claims as a standard for evaluating the melt viscosity stability of polypropylene. A completely stable polypropylene would undergo no change in melt viscosity with time; in other words, the curve obtained in graphing the results of the Brabender Plastograph test would be parallel to the time axis. The fact is, however, that the melt viscosity torque of an unstabilized isotactic polypropylene changes in fifteen minutes' time from 4000 kg.-cm. to 200 kg.-cm. This enormously rapid change in viscosity is believed to result from degradation, i.e., depolymerization, of the polymer.

In an effort to overcome this difficulty, various stabilizers have been incorporated with the commercially available polypropylene. The resulting polypropylene has a reduced rate of change of melt viscosity compared to the unstabilized polymer. An excellent stabilizer will make it possible to hold the melt viscosity torque within the range from 3400 to 1700 kg.-cm. over a period of approximately twenty minutes. This is satisfactory for many purposes but there is much room for improvement, particularly since certain operations require that the viscosity be held within rather narrow limits for a much longer period of time.

In accordance with the invention, polypropylene is effectively stabilized against reduction in melt viscosity at elevated temperatures for a sufficiently long period of time to enable it to be worked into the desired shape by adding thereto a stabilizer combination of at least two compounds selected from two classes of the group consisting of organotin mercaptides, phenols, and organic neutral phosphites. Such combinations provide greater stability than the sum of the stabilities furnished by any of the components taken separately. The enhanced effect is obtainable by incorporating the stabilizer in any polypropylene, whether or not previously degraded.

Surprisingly, it has been found that in addition to the enhanced effect due to the combination, when the stabilizer combination is added to a partially degraded polymer, it is more effective in stabilizing the polymer against further reduction in melt viscosity than if the stabilizer is added initially. However, the stabilizer combinations of the invention are very much more effective than the same compounds when used alone, and they are capable of stabilizing polypropylene in a satisfactory manner even when added initially to a substantially undegraded polypropylene.

Commercial polypropylene has a melt viscosity torque of about 4000 kg.-cm. at 193° C. When kept at this temperature degradation occurs, measurable by the reduction in melt viscosity. The term "partially degraded polypropylene" as used in this application means a polypropylene whose melt viscosity is less than about 3000 kg.-cm. at 193° C. It will be apparent that the possibility of stabilizing a partially degraded polypropylene has the great advantage that the polypropylene can be brought to a workable melt viscosity by degradation and then stabilized at that viscosity by adding at that time the stabilizer combination of the invention.

If the stabilizer combination is added to polypropylene which has not been degraded to a significant degree, it is capable of holding the rate of reduction in the melt viscosity torque to a rate of less than about 50 kg.-cm. per minute at 193° C. If the stabilizer combination is added to a polypropylene at a stage of degradation, for example, corresponding to a melt viscosity of 1500 kg.-cm., it is capable of holding the rate of reduction in the melt viscosity torque to a rate of 2 kg.-cm. or less per minute for sixty minutes or longer.

The reason the stabilizer combination is more effective when added to the partially degraded polypropylene rather than when added to the non-degraded polypropylene is not as yet fully understood. It is possible that in the course of the degradation free radicals or peroxides are formed, which react with the stabilizer. These may not appear in significant amounts until rather late in the degradation reaction. These free radicals or peroxides may be an indispensable intermediate in further degradation of the polymer, and thus reaction thereof with the stabilizer by removing them from the system effectively prevents further degradation. It is also possible that the stabilizer in some way assists re-polymerization of the polypropylene, so that graft polymers may form in the degraded polymer with the aid of the stabilizer. This competing re-polymerization reaction in dynamic equilibrium with the degradation reaction rseults in an apparent arresting of the degradation of the polymer at the stage at which the stabilizer is added. When the stabilizer is present ab initio, it apparently early in the degradation becomes tied up with the degradation products as they are formed in a different way, and thus is not sufficiently effective at a later stage when it is needed most. Thus, it cannot function in the same way as when the stabilizer is added after degradation has well begun. This explanation is, however, still entirely a theory, and has not as yet been confirmed by experimental evidence.

The invention employs a special stabilizer combination of two or more compounds of which at least one is an organotin mercaptide or a phenol, and the second can be the other of these or an organic phosphite. Best stabilization is obtained by using three compounds together, one from each of these classes.

Each stabilizing component of the stabilizer combination should have a very low vapor pressure at the working temperature. Preferably, it is substantially nonvolatile at this temperature, so that it will not be lost from the mix during hot-working, which in some instances requires a considerable period of time. It also should be compatible with the resin at all temperatures to which the composition is to be subjected.

The phenol contains one or more phenolic nuclei. One, two or more phenolic groups may be present. In addition, the phenolic nucleus may contain an amino group.

The alkyl-substituted phenols and polynuclear phenols have a higher boiling point, and therefore are preferred because of their lower volatility. The alkyl group or groups should total at least six carbon atoms. The longer the alkyl chains, the better the compatibility with polypropylene, inasmuch as the phenolic compound then acquires more of an aliphatic hydrocarbon character, and therefore there is no upper limit on the number of alkyl carbon atoms. Usually, from the standpoint of availability, the compound will not have more than about eighteen carbon atoms in the alkyl groups. The compounds may have from one to five alkyl radicals, preferably in the ortho or para positions to the phenolic group.

Exemplary of phenols in this class are p-octyl phenol, p-dodecyl phenol, p-octadecyl phenol, p-isooctyl-m-cresol, p-isohexyl-o-cresol, 2,6-ditertiary butyl phenol, 2,6-diisopropyl phenol, 2,6-ditertiary butyl-p-cresol, methylenebis-2,6-ditertiary butyl phenol, 2,2-bis(4-hydroxy phenyl) propane, methylenebis-p-cresol, 4,4'-thio-bisphenol, 4,4'-thiobis(3-methyl-6-tertiary butyl phenol), 2,2'-thiobis(4-methyl-6-tertiary butyl phenol), 2,6-diisooctyl resorcinol, 4-octyl pyrogallol, and 3,5-ditertiary butyl catechol. Among the aminophenols which can be used are 2-isooctyl-p-aminophenol, N-stearoyl-p-aminophenol, 2,6-diisobutyl-p-aminophenol, and N-ethylhexyl-p-aminophenol.

The organotin mercaptides have the formula:

$$R_xSn(SR')_{4-x}$$

in which R is a monovalent hydrocarbon radical having from one to about eighteen carbon atoms and SR' is the radical of a mercaptan. R' is a monovalent organic radical having from one to eighteen carbon atoms, including hydrocarbon radicals and hydrocarbon radicals containing substituent groups such as unesterified or esterified hydroxy (OH), carboxy (COOH), carboxy ester (COOR") and carboxy amide (CONR'''$_2$) groups, where R" is an alkyl radical of one to about twelve carbon atoms and R''' is selected from the group consisting of hydrogen and monovalent hydrocarbon radicals having from one to about twelve carbon atoms. When R' is a hydrocarbon radical, R and R' may be the same or different. SR' also may be a xanthate radical.

The R and R' hydrocarbon radicals can be aliphatic, cycloaliphatic or aromatic, and include alkyl, cycloalkyl and aryl groups, for example, methyl, ethyl, propyl, butyl, hexyl, dodecyl, octadecyl, isopropyl, isobutyl, tertiary butyl, cyclopropyl, cyclohexyl, cyclopentyl, hexahydrotolyl, tolyl, xylyl, phenyl, naphthyl, and benzyl.

Examples of substituted SR' radicals are found in the mercapto tin compounds derived from mercaptoethanol, thioglycerine, mercaptoethanol laurate (an esterified hydroxy), dimercaptoethanol adipate, dimercaptoethanol phthalate, thioglycolic acid, mercaptosuccinic acid, octyl thioglycolate, ethylene glycol dithioglycolate, dibutyl mercaptosuccinate, diamylamide or morpholinamide of thioglycolic acid, dibutylamide of gamma-thiobutyric acid, and isopropyl or octyl xanthate.

The organic phosphites contain one or more, up to a total of three, aryl, alkyl, aralkyl and alkaryl groups, in any combination. The term "trialkylaryl" is inclusive of alkyl, aryl, alkaryl and aralkyl phosphites containing any assortment of alkyl, aryl, alkaryl and aralkyl groups. Exemplary are triphenyl phosphite, tricresyl phosphite, tri(dimethylphenyl) phosphite, tributyl phosphite, trioctyl phosphite, tridodecyl phosphite, octyl diphenyl phosphite, dioctyl phenyl phosphite, tri(octylphenyl) phosphite, tri(nonylphenyl) phosphite, tribenzyl phosphite, butyl dicresyl phosphite, octyl di(octylphenyl) phosphite, tri(2-ethyl-hexyl) phosphite, tritolyl phosphite, tri(2-cyclohexylphenyl) phosphite, tri-alpha-naphthyl phosphite, tri(phenylphenyl) phosphite, and tri(2-phenylethyl) phosphite.

A sufficient amount of the stabilizer combination is used to hold the change in melt viscosity with time at the hot-working temperature to the limit required for working with the equipment at hand. Very small amounts are usually adequate. Amounts within the range from about 0.005 to about 5% by weight of the polypropylene are satisfactory. Preferably, from 0.1 to 1% is employed for optimum stabilization. There is no real upper limit on the amount of stabilizer, but inasmuch as these compounds are expensive, and stabilization for the hot-working time is usually all that is required, it is usually desirable to use the minimum necessary to give the required stabilization.

The invention is applicable to any polypropylene. Isotactic or Ziegler-process polypropylene, available commercially under the name Pro-Fax, and having a softening or hot-working temperature of about 350° F. is an example of a sterically regular polypropylene polymer. Mixtures and copolymers of a polypropylene with other compatible polymers not reactive with the polypropylene stabilizer combination also can be treated, for example, mixtures of polyethylene and polypropylene, and copolymers of propylene and ethylene which have a sufficient amount of propylene to present the instability problem that is resolved by the stabilizer combinations of the invention. After the polypropylene has been worked so that its melt viscosity has been reduced to the desired range, the stabilizer is incorporated in the polymer in suitable mixing equipment, such as a mill or a Banbury mixer. Working and blending is continued until the mixture is substantially uniform. The resulting composition is then removed from the mixing equipment, and reduced to the size and shape desired for marketing or use. The melt viscosity remains stable for a sufficient length of time to enable it to be hot-worked later into the desired shape, such as by milling, calendering, extrusion or injection molding, or fiber-forming.

In order to degrade a fully polymerized polypropylene, the polypropylene, normally supplied in granular or powder form, can be worked in the heated mixing rolls or other type of polypropylene compounding machine and the temperature maintained sufficiently high to soften the polypropylene. Mixing is continued at this temperature, usually of the order of 350° F. or higher, for several minutes, until the polypropylene has softened appreciably, such that its melt viscosity is within the desired range. The stabilizer combination is added to the polypropylene when it has reached the desired melt viscosity.

If the starting material is a previously degraded polymer, the polymer need not be further degraded unless its softening temperature or melt viscosity is too high for satisfactory use.

The degree of degradation desired will depend upon the melt viscosity required for the final processing operation (calendering, extrusion, molding, etc.). In the examples, a melt viscosity corresponding to a plastograph torque of 1500 kg.-cm. has been employed. Similar effects, however, are seen at other stages of degradation, either above or below 1500 kg.-cm.

The following examples in the opinion of the inventors represent the best embodiments of their invention.

EXAMPLE 1

Isotactic polypropylene not previously stabilized was heated in a Brabender Plastograph to 193° C. and kept at this temperature for fifteen minutes while the melt viscosity and rate of change of torque were noted. The results are given in the following table under A.

Five additional portion of the same polypropylene were heated in the Brabender Plastograph at 193° C. until the melt viscosity had reached 1500 kg.-cm. To the mix there was then added the stabilizers listed in the table in the amount given and the further reduction in melt viscosity followed for a total of not in excess of forty minutes. The results are given below in B, C, D, E and F.

per minute. This low rate is not obtained when stabilization is effected with the individual stabilizer components, even when used in a far greater amount, as shown by C and E.

EXAMPLE 2

Isotactic polypropylene not previously stabilized was heated in a Brabender Plastograph to 193° C. until the melt viscosity had reached 1500 kg.-cm. To the mix was then added 0.5% dibutyl tin didodecyl mercaptide and the further reduction in melt viscosity followed for an additional forty minutes. The results are given below under A.

Another portion of the same polypropylene was heated in the Brabender Plastograph at 193° C. until the melt viscosity had reached 1500 kg.-cm. and there was then added 0.875% octyl diphenyl phosphite and the further reduction in melt viscosity was then followed for an additional twenty minutes. The results are given below under B.

A third portion of the same polypropylene was heated in the Brabender Plastograph at 193° C. until the melt viscosity had reached 1500 kg.-cm. and to the mix there was then added 0.25% octyl diphenyl phosphite and 0.5% dibutyl tin didodecyl mercaptide. The further reduction in melt viscosity was followed for an additional forty minutes. The results are given below under C.

*Table I*

MELT VISCOSITY AND RATE OF REDUCTION OF MELT VISCOSITY OF POLYPROPYLENE CONTAINING DIBUTYL TIN DIDODECYL MERCAPTIDE AND 4,4'-THIOBIS (3-METHYL-6-TERTIARY-BUTYL PHENOL) AT 193° C. (KG.-CM. OF TORQUE)

| After minutes | A<br>No stabilizer | | B<br>0.5% dibutyl tin didodecyl mercaptide | | C<br>0.875% dibutyl tin didodecyl mercaptide | | D<br>0.125% 4,4'-thiobis(3-methyl-6-tertiary-butyl phenol) | | E<br>0.875% 4,4'-thiobis (3-methyl-6-tertiary-butyl phenol) | | F<br>0.5% dibutyl tin didodecyl mercaptide and 0.125% 4,4'-thiobis (3-methyl-6-tertiary-butyl phenol) | |
|---|---|---|---|---|---|---|---|---|---|---|---|---|
| | Torq. | Rate of change of torq. | Torq. | Rate of change of torq. | Torq. | Rate of change of torq. | Torq. | Rate of change of torq. | Torq. | Rate of change of torq. | Torq. | Rate of change of torq. |
| 0 | 4,000 | | 4,000 | | 4,000 | | 4,000 | | 4,000 | | 4,000 | |
| 3 | 1,500 | | 1,500 | | 1,500 | | 1,500 | | 1,500 | | 1,500 | |
| 7 | 700 | 170 | 1,280 | 22.2 | 1,270 | 22.4 | 1,120 | 24.8 | 1,160 | 18.4 | 1,280 | 22.2 |
| 10 | 370 | 56 | 1,230 | 14.2 | 1,220 | 16.4 | 1,040 | 27.8 | 1,110 | 12.6 | 1,240 | 10.8 |
| 15 | 200 | | 1,170 | 12.6 | 1,150 | 12.4 | 900 | 34.7 | 1,060 | 9.6 | 1,200 | 5.4 |
| 20 | | | 1,110 | 12.0 | 1,090 | 10.0 | 660 | 43.0 | 1,010 | 8.8 | 1,180 | 3.0 |
| 25 | | | 1,060 | 11.2 | 1,050 | 9.6 | 460 | 36.7 | 980 | 6.6 | 1,170 | 3.6 |
| 30 | | | 1,000 | 10.0 | 1,010 | 7.4 | 290 | | 950 | 5.4 | 1,150 | 4.6 |
| 35 | | | 960 | 7.8 | 980 | 6.6 | | | 920 | 5.0 | 1,120 | 5.8 |
| 40 | | | 920 | 7.8 | 960 | 5.8 | | | 980 | 4.6 | 1,080 | 6.8 |

The rate of change in torque shown in the table is kg.-cm. per minute.

It is apparent by comparison of A with B, C, D and E that dibutyl tin didodecyl mercaptide and 4,4'-thiobis(3-methyl-6-tertiary-butyl phenol) alone give some degree of stabilization. The decrease in melt viscosity is relatively rapid in D, but is considerably improved by using a larger amount, as shown in E. However, even 0.875% of 4,4'-thiobis(3-methyl-6-tertiary-butyl phenol) holds the viscosity within the range from 1500 to 1060 kg.-cm. for only twelve minutes. B and C show that 0.5 and 0.875% dibutyl tin didodecyl mercaptide hold the viscosity within the range from 1500 to approximately 1050 kg.-cm. for only twenty-two minutes.

F shows that both stabilizers together are capable of giving a better stabilization of the melt viscosity torque than either stabilizer alone in a much greater total amount. F shows that both stabilizers together enable one to hold the melt viscosity torque within the range from 1500 to 1080 kg.-cm. for thirty-seven minutes.

The rate of change of torque is equally improved. Using the combination in F, it is as little as 3 kg.-cm.

*Table II*

| After minutes | A<br>0.5% dibutyl tin didodecyl mercaptide | | B<br>0.875% octyl diphenyl phosphite | | C<br>0.25% octyl diphenyl phosphite and 0.5% dibutyl tin didodecyl mercaptide | |
|---|---|---|---|---|---|---|
| | Torq. | Rate of change of torq./min. | Torq. | Rate of change of torq./min. | Torq. | Rate of change of torq./min. |
| 0 | 4,000 | | 4,000 | | 4,000 | |
| 3 | 1,500 | | 1,400 | | 1,500 | |
| 7 | 1,280 | 22.2 | 800 | 92.0 | 1,260 | 18.6 |
| 10 | 1,230 | 14.2 | 560 | 56.0 | 1,220 | 13.8 |
| 15 | 1,170 | 12.6 | 340 | 30.0 | 1,160 | 9.2 |
| 20 | 1,110 | 12.0 | 220 | | 1,110 | 6.2 |
| 25 | 1,060 | 11.2 | | | 1,100 | 3.8 |
| 30 | 1,000 | 10.0 | | | 1,080 | 3.4 |
| 35 | 960 | 7.8 | | | 1,060 | 4.2 |
| 40 | 920 | 7.8 | | | 1,020 | 9.0 |

The data show that the octyl diphenyl phosphite has practically no stabilizing properties. The results are to be compared with composition A of Example 1.

When, however, this compound is combined with the dibutyl tin didodecyl mercaptide, a remarkable improvement in stabilization is obtained, over and above that obtainable with the dibutyl tin didodecyl mercaptide alone. The melt viscosity is held within the range from 1260 to 1020 kg.-cm. for thirty-three minutes.

This improvement is reflected in the rate of change of torque. This rate of change is greatly less for C than for either A or B.

EXAMPLE 3

A portion of the isotactic polypropylene of Example 1 was heated in a Brabender Plastograph at 193° C. until the melt viscosity had reached 1500 kg.-cm. and to it was then added 0.125% of 4,4'-thiobis(3-methyl-6-tertiary-butyl phenol). Heating was continued at 193° C. and the melt viscosity followed for an additional twenty-seven minutes.

Another portion of the same polypropylene was heated in the Brabender Plastograph at 193° C. until the melt viscosity had reached 1500 kg.-cm. To the mix there was then added 0.875% octyl diphenyl phosphite, after which the reduction in melt viscosity was followed for an additional seven minutes.

A third portion of the same polypropylene was heated in the Brabender Plastograph at 193° C. until melt viscosity had reached 1500 kg.-cm. and to the mix there was then added 0.125% of 4,4'-thiobis(3-methyl-6-tertiary-butyl phenol) and 0.25% octyl diphenyl phosphite. The reduction in melt viscosity was then followed for an additional twenty-seven minutes.

The octyl diphenyl phosphite has practically no stabilizing action. The 4,4'-thiobis(3-methyl-6-tertiary-butyl phenol) has some stabilizing action, but it is possible to hold the reduction in melt viscosity within the range from 1500 to 900 kg.-cm. only for twelve minutes. When both these compounds are used together, it is possible to hold the melt viscosity within the range from 1500 to 1060 kg.-cm. for twenty-seven minutes, a remarkable increase.

This increase is even better shown in the data for the rate of change of torque, where the value for both compounds used together is as low as 5.

EXAMPLE 4

A portion of isotactic polypropylene, the same material used in the preceding examples, was heated in the Brabender Plastograph at 193° C. until the melt viscosity had reached 1500 kg.-cm. To the mix there was then added 0.125% 4,4'-thiobis(3-methyl-6-tertiary-butyl phenol), 0.5% dibutyl tin didodecyl mercaptide and 0.25% octyl diphenyl phosphite. The reduction in melt viscosity was then followed for an additional seventy-five minutes. The results are reported below under D.

These results are to be compared with similar compositions containing only two of these compounds in combination, as prepared in Examples 1F, 2C and 3C. These results are reported below under A, B and C, respectively.

Table IV

| After minutes | A — 0.5% dibutyl tin didodecyl mercapide and 0.125% 4,4'-thiobis(3-methyl-6-tertiary-butyl phenol) | | B — 0.25% octyl diphenyl phosphite and 0.5% dibutyl tin didodecyl mercaptide | | C — 0.125% 4,4'-thiobis(3-methyl-6-tertiary butyl phenol) and 0.25% octyl diphenyl phosphite | | D — 0.125% 4,4'-thiobis(3-methyl-6-tertiary butyl phenol), 0.5% dibutyl tin didodecyl mercaptide and 0.25% octyl diphenyl phosphite | |
|---|---|---|---|---|---|---|---|---|
| | Torq. | Rate of change of torq./min. | Torq. | Rate of change of torq./min. | Torq. | Rate of change of torq./min. | Torq. | Rate of change of torq./min. |
| 0 | 4,000 | | 4,000 | | 4,000 | | 4,000 | |
| 3 | 1,500 | | 1,500 | | 1,500 | | 1,500 | |
| 7 | 1,280 | 22.2 | 1,260 | 18.6 | 1,200 | 15.4 | 1,320 | 0.0 |
| 10 | 1,240 | 10.8 | 1,220 | 13.8 | 1,170 | 7.8 | 1,320 | 0.0 |
| 15 | 1,200 | 5.4 | 1,160 | 9.2 | 1,150 | 5.0 | 1,320 | 0.3 |
| 20 | 1,180 | 3.0 | 1,110 | 6.2 | 1,120 | 5.0 | 1,310 | 0.5 |
| 25 | 1,170 | 3.6 | 1,100 | 3.8 | 1,100 | 5.0 | 1,280 | 1.8 |
| 30 | 1,150 | 4.6 | 1,080 | 3.4 | 1,060 | 9.2 | 1,270 | 1.4 |
| 35 | 1,120 | 5.8 | 1,060 | 4.2 | | | 1,260 | 1.8 |
| 40 | 1,080 | 6.8 | 1,020 | 9.0 | | | 1,250 | 1.2 |
| 45 | | | | | | | 1,250 | 1.0 |
| 50 | | | | | | | 1,240 | 0.4 |
| 55 | | | | | | | 1,240 | 0.0 |
| 60 | | | | | | | 1,240 | 0.0 |
| 65 | | | | | | | 1,230 | 2.8 |
| 70 | | | | | | | 1,220 | 5.2 |
| 75 | | | | | | | 1,200 | |

The results are reported below under A, B, and C, respectively.

Table III

| After minutes | A — 0.125% 4,4'-thiobis(3-methyl-6-tertiary-butyl phenol) | | B — 0.875% octyl diphenyl phosphite | | C — 0.125% 4,4'-thiobis(3-methyl-6-tertiary-butyl phenol) and 0.25% octyl diphenyl phosphite | |
|---|---|---|---|---|---|---|
| | Torq. | Rate of change of torq./min. | Torq. | Rate of change of torq./min. | Torq. | Rate of change of torq./min. |
| 0 | 4,000 | | 4,000 | | 4,000 | |
| 3 | 1,500 | | 1,400 | | 1,500 | |
| 7 | 1,120 | 24.8 | 800 | 92.0 | 1,200 | 15.4 |
| 10 | 1,040 | 27.8 | 560 | 56.0 | 1,170 | 7.8 |
| 15 | 900 | 34.7 | 340 | 30.0 | 1,150 | 5.0 |
| 20 | 660 | 43.0 | 220 | | 1,120 | 5.0 |
| 25 | 460 | 36.7 | | | 1,100 | 5.0 |
| 30 | 290 | | | | 1,060 | 9.2 |

It is apparent that a remarkable increase in stabilization is obtainable by using three compounds in combination in place of two. This increase in stability is very well reflected in the data for rate of change of torque. In the case of the three component combination, for approximately sixty minutes, this rate of change over the range from 1320 to 1230 kg.-cm. reaches a maximum of 1.8, and is as low as 0 for some time. Even at the end of seventy-five minutes of heating the melt viscosity is still at 1200 kg.-cm. This proves that the three component system is highly superior to any of the two component systems.

This work was repeated, using polypropylene which had been degraded to 2000 kg.-cm. and to 1000 kg.-cm., respectively. Comparable results were obtained.

EXAMPLE 5

Example 4D was repeated, substituting for the octyl diphenyl phosphite, triphenyl phosphite and phenyl dioctyl phosphite and trioctyl phosphite, respectively. The results are reported below under A, B and C, respectively.

Table V

| After minutes | A Triphenyl phosphite | B Phenyl dioctyl phosphite | C Trioctyl phosphite |
|---|---|---|---|
| 0 | 4,000 | 4,000 | 4,000 |
| 3 | 1,500 | 1,320 | 1,320 |
| 6 | 1,300 | 1,240 | 1,240 |
| 10 | 1,260 | 1,220 | 1,220 |
| 18 | 1,210 | 1,180 | 1,180 |
| 26 | 1,200 | 1,180 | 1,180 |
| 30 | 1,190 | 1,170 | 1,160 |
| 35 | 1,180 | 1,160 | 1,140 |
| 40 | 1,160 | 1,140 | 1,120 |
| 45 | 1,140 | 1,110 | 1,080 |
| 50 | 1,120 | 1,070 | 1,040 |
| 55 | 1,100 | 1,040 | 990 |
| 60 | 1,070 | 1,010 | 940 |
| 65 | 1,040 | 970 | 890 |
| 70 | 1,000 | 920 | 830 |
| 75 | 940 | 860 | 770 |

It is apparent that all of these phosphites are approximately equally effective in holding the reduction in melt viscosity to a maximum of 500 kg.-cm. over a period of over one hour.

EXAMPLE 6

Example 4D was repeated, substituting for the 4,4'-thiobis(3 - methyl - 6 - tertiary-butyl phenol), 4,4'-thiobisphenol and 2,2'-bis(4-hydroxy phenyl) propane and 2,6-ditertiary-butyl-p-cresol, respectively. The results are reported below under A, B and C, respectively.

Table VI

| After minutes | A 4,4'-thiobis-phenol | B 2,2'-bis(4-hydroxy phenyl) propane | C 2,6-ditertiary butyl-p-cresol |
|---|---|---|---|
| 0 | 4,000 | 4,000 | 4,000 |
| 3 | 1,500 | 1,500 | 1,500 |
| 6 | 1,360 | 1,260 | 1,320 |
| 10 | 1,320 | 1,200 | 1,240 |
| 18 | 1,290 | 1,150 | 1,160 |
| 26 | 1,270 | 1,130 | 1,110 |
| 30 | 1,255 | 1,120 | 1,100 |
| 35 | 1,240 | 1,110 | 1,100 |
| 40 | 1,220 | 1,100 | |
| 45 | 1,200 | 1,090 | |
| 50 | 1,190 | 1,080 | |
| 55 | 1,170 | 1,070 | |
| 60 | 1,150 | 1,060 | |
| 65 | 1,130 | 1,040 | |
| 70 | 1,110 | 950 | |
| 75 | 1,090 | 660 | |

The 4,4'-thiobisphenol and 2,2'(4-hydroxy phenyl) propane are approximately as effective as the 4,4'-thiobis(3-methyl-6-tertiary-butyl phenol). There was a sudden reduction in melt viscosity after thirty-five minutes in the case of 2,6-ditertiary butyl-p-cresol which is believed due to the greater volatility of this compound. Apparently, by the time the heating is continued for thirty-five minutes enough of the compound has been lost from the mixture to eliminate its stabilizing effect. However, this is no disadvantage if the processing can be completed within thirty-five minutes. If it cannot be, more of the phenol can be added.

EXAMPLE 7

Example 4D was repeated, using dibutyl tin dioctyl thioglycolate in place of dibutyl tin dilauryl mercaptide. The results are given below.

Table VII

| After minutes: | Dibutyl tin dioctyl thioglycolate |
|---|---|
| 0 | 4000 |
| 3 | 1500 |
| 5 | 1240 |
| 10 | 1200 |
| 18 | 1190 |
| 26 | 1170 |
| 30 | 1160 |
| 35 | 1150 |
| 40 | 1140 |
| 45 | 1130 |
| 50 | 1120 |
| 55 | 1115 |
| 60 | 1110 |
| 65 | 1100 |

It is apparent that this compound is just as effective as dibutyl tin didodecyl mercaptide. The combination of compounds is capable of holding melt viscosity within the range from 1240 to 1100 kg.-cm. for one hour.

EXAMPLE 8

A portion of the commercial prestabilized polypropylene Pro-Fax 6501 was heated in a Brabender Plastograph at 193° C. until the melt viscosity had reached 1500 kg.-cm. and to it was then added 0.375% 4,4'-thiobis(3-methyl-6-tertiary-butyl phenol). Heating was continued at 193° C. and the melt viscosity followed for an additional thirty-seven minutes. The results are reported below under A.

Two additional portions of the same polypropylene were brought to 1500 kg.-cm. viscosity in the Brabender Plastograph and to them were added 0.375% octyl diphenyl phosphite and a mixture of 0.125% 4,4'-thiobis(3-methyl-6-tertiary-butyl phenol) and 0.25% octyl diphenyl phospite, respectively. Heating at 193° C. was continued and the melt viscosity followed for an additional thirty-seven minutes. The data obtained is reported below under B and C.

Table VIII

| After minutes | A 0.375% 4, 4'-thiobis (3-methyl-6-tertiary-butyl phenol) | | B 0.375% octyl diphenyl phosphite | | C 0.125% 4, 4'-thiobis (3-methyl-6-tertiary-butyl phenol) and 0.25% octyl diphenyl phosphite | |
|---|---|---|---|---|---|---|
| | Torq. | Rate of change of torq./min. | Torq. | Rate of change of torq./min. | Torq. | Rate of change of torq./min. |
| 0 | 4,000 | | 4,000 | | 4,000 | |
| 3 | 1,500 | | 1,500 | | 1,500 | |
| 7 | 1,150 | 40.0 | 780 | 114.0 | 1,340 | 15.7 |
| 10 | 1,060 | 21.2 | 450 | | 1,310 | 8.4 |
| 15 | 980 | 13.8 | | | 1,280 | 4.6 |
| 20 | 930 | 8.0 | | | 1,260 | 4.6 |
| 25 | 890 | 8.0 | | | 1,240 | 4.6 |
| 30 | 850 | 8.0 | | | 1,210 | 6.8 |
| 35 | 810 | 8.0 | | | 1,170 | 10.2 |
| 40 | 770 | 8.0 | | | 1,100 | |

The combination of both stabilizers is shown by C to be greatly superior to either stabilizer alone. The octyl diphenyl phosphite has very little stabilizing action. The 4,4'-thiobis(3-methyl-6-tertiary-butyl phenol) is capable of holding the melt viscosity within the range from 1500 to 1060 for only approximately seven minutes, whereas the combination of it with the octyl diphenyl phosphite holds the melt viscosity at from 1500 to 1100 kg.-cm. for thirty-seven minutes.

EXAMPLE 9

Isotactic polypropylene was worked to its softening temperature of 350° F. on heated differential speed rollers and formed into a continuous band. The compounded polypropylene was heated at this temperature for four minutes after banding at the end of which time the polypropylene had reached a suitable melt viscosity. 0.5% of dibutyl tin didodecyl mercaptide, 0.125% 4,4'-thiobis (3-methyl-6-tertiary-butyl phenol) and 0.25% octyl diphenyl phosphite then were added and working continued for an additional fifty-six minutes. The compounded polypropylene showed practically no significant change in workability for one hour after the stabilizer combination had been added. Unstabilized polypropylene becomes workable after ten minutes of milling.

EXAMPLE 10

Example 9 was repeated, using in place of the octyl diphenyl phosphite, triphenyl phosphite. The stabilizing effect was comparable to that obtained in Example 9.

EXAMPLE 11

Example 9 was repeated using dibutyl tin dioctyl thioglycolate in place of dibutyl tin didodecyl mercaptide. The stabilizing effect was comparable to that in Example 9.

EXAMPLE 12

Example 9 was repeated using 4,4'-thiobisphenol in place of 4,4'-thiobis(3-methyl-6-tertiary-butyl phenol). The stabilizing effect was comparable to that of Example 9.

EXAMPLE 13

Example 9 was repeated adding the stabilizer combination immediately after banding of the polypropylene on the mill. The compounded polypropylene remained rubbery and retained high viscosity during the first fifteen minutes of heating.

EXAMPLE 14

A portion of powdered isotactic polypropylene, the same material used in Example 1, was mixed with the additives set forth in the table below in the amounts given, and this mix was then charged in the Brabender Plastograph and heated at 193° C. in comparison with a control sample which contained no stabilizer. The reduction in melt viscosity was followed for a total of forty minutes, and the results are reported below under A, B, C and D.

*Table IX*

| After minutes | A<br>Unstabilized | B<br>0.50% dibutyl tin didodecyl mercaptide | C<br>0.50% 4,4'-thiobis (3-methyl-6-tertiary butyl phenol) | D<br>0.125% 4,4'-thiobis (3-methyl-6-tert.-butyl phenol) and 0.375% dibutyl tin didodecyl mercaptide |
|---|---|---|---|---|
| 0 | 4,000 | 4,000 | 4,000 | 4,000 |
| 3 | 1,500 | 3,300 | 3,300 | 3,700 |
| 5 | 1,100 | 2,300 | 2,530 | 3,350 |
| 7 | 700 | 2,060 | 2,100 | 3,150 |
| 10 | 370 | 1,830 | 1,830 | 2,770 |
| 15 | 200 | 1,630 | 1,680 | 2,300 |
| 20 | | 1,390 | 1,420 | 2,030 |
| 25 | | 930 | 1,200 | 1,830 |
| 30 | | 540 | 890 | 1,730 |
| 35 | | 340 | 630 | 1,640 |
| 40 | | 120 | 440 | 1,580 |

It is apparent that the stabilizer combination of D was considerably more effective than any of the stabilizers alone, although the stabilizers individually gave a considerable improvement over the control which did not contain any stabilizer. The stabilizer combination was capable of holding the melt viscosity within the range from 3350 to 1580 kg.-cm. for thirty-five minutes, whereas the melt viscosity of the sample containing the best of the individual stabilizers (C) had declined to 1200 kg.-cm. within twenty-five minutes.

This application is a continuation in part of our prior application, Serial No. 762,681, filed September 23, 1958.

We claim:
1. A polypropylene composition having improved processability at elevated temperatures, and a low reduction in melt viscosity at such temperatures, comprising polypropylene and a stabilizer combination consisting essentially of (1) an organotin mercaptide having the formula

$$R_xSn(SR')_{4-x}$$

wherein R is a monovalent hydrocarbon radical having from one to about eighteen carbon atoms, R' is a monovalent organic radical having one to about eighteen carbon atoms selected from the group consisting of hydrocarbon radicals and hydrocarbon radicals having hydroxy, carboxylic acid, carboxylic ester and carboxyamide groups, and $x$ is an integer from 1 to 3, (2) an alkyl phenol, the alkyl group having from six to about eighteen carbon atoms, and (3) an organic neutral phosphite having three groups selected from the group consisting of alkyl, aryl and aralkyl groups having from four to fifteen carbon atoms, said stabilizer combination being present in an amount within the range from about 0.005 to about 5% by weight of the polypropylene to slow the reduction in melt viscosity at elevated temperatures.

2. A polypropylene composition in accordance with claim 1 wherein the organotin mercaptide is an alkyl tin alkyl mercaptide in which the alkyl groups have from one to eighteen carbon atoms.

3. A polypropylene composition in accordance with claim 1 wherein the organic neutral phosphite is a trialkyl phosphite in which the alkyl groups have from four to fifteen carbon atoms.

4. A polypropylene composition in accordance with claim 1 wherein the organic neutral phosphite is a triaryl phosphite.

5. A polypropylene composition in accordance with claim 1 wherein the organic neutral phosphite is a trialkaryl phosphite in which the alkaryl groups have from seven to fifteen carbon atoms.

6. A polypropylene composition in accordance with claim 1 wherein the organic neutral phosphite is a trialkyl aryl phosphite wherein the alkyl and aryl groups have from four to fifteen carbon atoms.

7. A polypropylene composition in accordance with claim 1 wherein the alkyl phenol is an alkyl bisphenol in which the alkyl group has from six to eighteen carbon atoms.

8. A polypropylene composition having improved processability at elevated temperatures, and a low reduction in melt viscosity at such temperatures, comprising polypropylene and a stabilizer combination consisting essentially of (1) an organotin mercaptide having the formula $$R_xSn(SR')_{4-x}$$

wherein R is a monovalent hydrocarbon radical having from one to about eighteen carbon atoms, R' is a monovalent organic radical having one to about eighteen carbon atoms selected from the group consisting of hydrocarbon radicals and hydrocarbon radicals having hydroxy, carboxylic acid, carboxylic ester and carboxyamide groups, and $x$ is an integer from 1 to 3, (2) a phenol having the formula

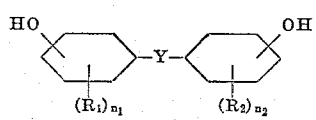

wherein Y is selected from the group consisting of sulfur and alkylene having from one to three carbon atoms, and $R_1$ and $R_2$ are selected from the group consisting of hydrogen and alkyl having from one to four carbon atoms, and $n_1$ and $n_2$ are integers of from 0 to 2, and (3) an organic neutral phosphite having three groups selected from the group consisting of alkyl, aryl and aralkyl groups having from four to fifteen carbon atoms, said stabilizer combination being present in an amount within the range from about 0.005 to about 5% by weight of the polypropylene to slow the reduction in melt viscosity at elevated temperatures.

9. A polypropylene composition in accordance with claim 8 wherein the Y radical of the phenol is sulfur.

10. A polypropylene composition in accordance with claim 8 wherein the Y radical of the phenol is alkylene having from one to three carbon atoms.

11. A polypropylene composition in accordance with claim 8 wherein the organotin mercaptide is an alkyl tin alkyl mercaptide.

12. A polypropylene composition in accordance with claim 8 wherein the organic neutral phosphite is a trialkyl phosphite in which the alkyl groups have from four to fifteen carbon atoms.

13. A polypropylene composition in accordance with claim 8 wherein the organic neutral phosphite is a triaryl phosphite.

14. A polypropylene composition in accordance with claim 8 wherein the organic neutral phosphite is a trialkyl aryl phosphite wherein the alkyl and aryl groups have from four to fifteen carbon atoms.

References Cited in the file of this patent

UNITED STATES PATENTS

| | | |
|---|---|---|
| 2,564,646 | Leistner et al. | Aug. 14, 1951 |
| 2,716,092 | Leistner et al. | Aug. 23, 1955 |
| 2,726,226 | Werkhieser | Dec. 6, 1955 |
| 2,726,227 | Leistner et al. | Dec. 6, 1955 |
| 2,786,812 | McDermott | May 26, 1957 |
| 2,834,768 | Friedlander | May 13, 1958 |
| 2,867,594 | Hansen et al. | Jan. 6, 1959 |
| 2,883,363 | Leistner et al. | Apr. 21, 1959 |
| 2,885,415 | Ramsden | May 5, 1959 |
| 2,914,506 | Mack et al. | Nov. 24, 1959 |
| 2,985,617 | Salyer et al. | May 23, 1961 |
| 3,013,003 | Maragliano et al. | Dec. 12, 1961 |

OTHER REFERENCES

Smith: "British Plastics," volume 25 (1952), pages 304–7.